United States Patent
Becker et al.

(10) Patent No.: US 8,053,126 B2
(45) Date of Patent: Nov. 8, 2011

(54) WATER TRANSFER EFFICIENCY IMPROVEMENT IN A MEMBRANE HUMIDIFIER BY REDUCING DRY AIR INLET TEMPERATURE

(75) Inventors: Marc Becker, Idstein (DE); Christian Koenig, Dreieich (DE); Uwe Hannesen, Brechen (DE); Erik Schumacher, Cologne (DE); Steven D. Burch, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1375 days.

(21) Appl. No.: 11/536,778

(22) Filed: Sep. 29, 2006

(65) Prior Publication Data
US 2008/0081238 A1    Apr. 3, 2008

(51) Int. Cl.
*H01M 8/04* (2006.01)
(52) U.S. Cl. ........ 429/435; 429/428; 429/433; 429/434; 429/436; 429/437; 429/439
(58) Field of Classification Search ............ 429/13
See application file for complete search history.

(56) References Cited

U.S. PATENT DOCUMENTS

| | | | |
|---|---|---|---|
| 4,913,347 A * | 4/1990 | Burst et al. ............ | 236/13 |
| 6,416,891 B1 * | 7/2002 | Condit et al. ........... | 429/13 |
| 2002/0006537 A1 * | 1/2002 | Kobayashi et al. ....... | 429/26 |
| 2002/0146606 A1 * | 10/2002 | Kobayashi et al. ....... | 429/24 |
| 2004/0151958 A1 * | 8/2004 | Formanski et al. ....... | 429/26 |
| 2004/0151959 A1 * | 8/2004 | Formanski et al. ....... | 429/26 |
| 2004/0185315 A1 * | 9/2004 | Enjoji et al. .......... | 429/22 |
| 2005/0037250 A1 * | 2/2005 | Gunther ............... | 429/26 |
| 2006/0134482 A1 * | 6/2006 | Gunther et al. ......... | 429/26 |

FOREIGN PATENT DOCUMENTS
DE    102 03 311 A1    7/2003

OTHER PUBLICATIONS
Kaufmann, L., Machine translation of DE10203311 A1, Jul. 2003.*

* cited by examiner

*Primary Examiner* — Basia Ridley
*Assistant Examiner* — Sean P Cullen
(74) *Attorney, Agent, or Firm* — John A. Miller; Miller IP Group, PLC

(57) ABSTRACT

A fuel cell system that employs a heat exchanger and a charge air cooler for reducing the temperature of the cathode inlet air to a fuel cell stack during certain system operating conditions so that the cathode inlet air is able to absorb more moisture in a water vapor transfer unit. The system can include a valve that selectively by-passes the heat exchanger if the cathode inlet air does not need to be cooled to meet the inlet humidity requirements. Alternately, the charge air cooler can be cooled by an ambient airflow.

18 Claims, 2 Drawing Sheets

WATER TRANSFER EFFICIENCY IMPROVEMENT IN A MEMBRANE HUMIDIFIER BY REDUCING DRY AIR INLET TEMPERATURE

BACKGROUND OF THE INVENTION

1. Field of the Invention

This invention relates generally to a fuel cell system that employs a water vapor transfer (WVT) unit for controlling the humidity of cathode inlet air to a fuel cell stack and, more particularly, to a fuel cell system that employs a WVT unit for controlling the humidity of cathode inlet air to a fuel cell stack and a charge air cooler for controlling the temperature of the cathode inlet air.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack is typically controlled to control the relative humidity of the membranes by controlling several stack operating parameters, such as stack pressure, temperature, cathode stoichiometry and the relative humidity of the cathode air into the stack.

As mentioned above, water is generated as a by-product of the stack operation. Therefore, the cathode exhaust gas from the stack will include water vapor and liquid water. It is known in the art to use a water vapor transfer (WVT) unit to capture some of the water in the cathode exhaust gas, and use the water to humidify the cathode input airflow. Water in the cathode exhaust gas at one side of the membrane is absorbed by the membrane and transferred to the cathode air stream at the other side of the membrane.

If the cathode exhaust gas has a relative humidity below 100%, then the water transfer efficiency of the WVT unit significantly decreases. To overcome this loss of water transfer efficiency, it would typically be necessary to increase the size of the WVT unit to achieve the desired stack inlet humidity. However, as the size of the WVT unit increases, the cost of the WVT unit significantly increases. Also, larger WVT units could present packaging problems in the fuel cell system.

The cathode inlet air is heated by the compressor. It is known in the art that the cathode inlet air can be cooled prior to being sent to the WVT unit so that the cathode inlet air is at the proper temperature for absorbing more water and water vapor. In one known system, the stack cooling fluid that is used to cool the fuel cell stack is also used to cool the cathode inlet air so that the temperature of the cathode inlet air is about the same as the stack temperature.

SUMMARY OF THE INVENTION

In accordance with the teachings of the present invention, a fuel cell system is disclosed that employs a gas/liquid heat exchanger and a charge air cooler for reducing the temperature of the cathode inlet air to a fuel cell stack during certain system operating conditions so that the cathode inlet air is able to absorb more moisture in a water vapor transfer unit. The system can include a valve within a stack coolant loop that selectively by-passes the heat exchanger if the cathode inlet air does not need to be cooled to meet the inlet humidity requirements. In another embodiment, the heat exchanger is eliminated, and a gas/gas charge air cooler is employed that uses an air flow to reduce the temperature of the cathode inlet air. The charge air cooler may include a damper that can be selectively opened and closed to control how much airflow is provided for the cooling. Additionally, a second charge air cooler can be provided in the system that operates to heat the cathode inlet air during cold system start-ups.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system that employs a charge air cooler for reducing the temperature of the cathode inlet air sent to a fuel cell stack during certain system operating conditions so that the cathode inlet air is able to absorb more humidity in a water vapor transfer unit is merely exemplary in nature, and is in no way intended to limit the invention or its applications or uses.

Figure 1:
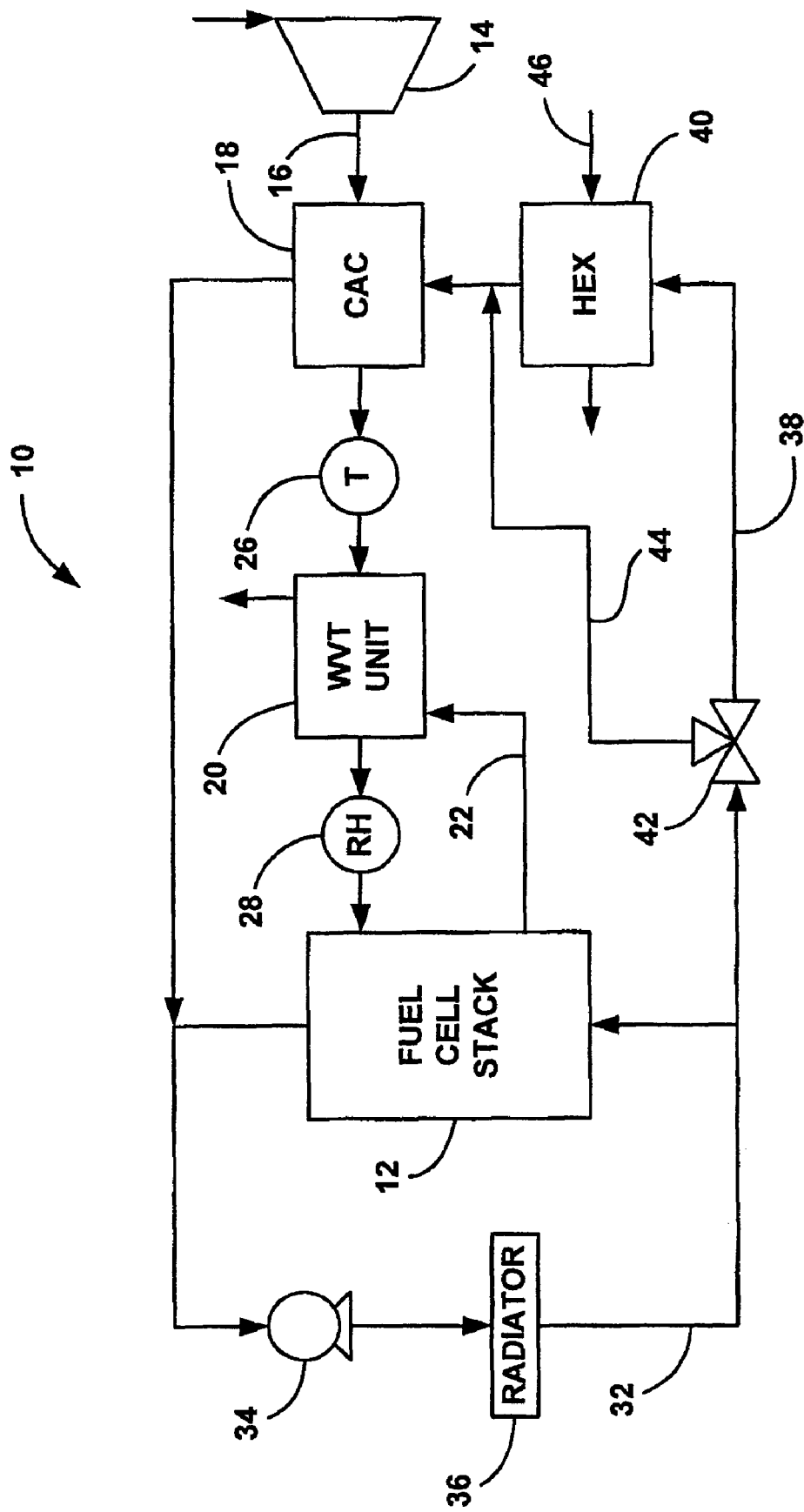
FIG. 1 is a schematic block diagram of a fuel cell system employing a cathode charge air cooler and a heat exchanger for cooling the cathode inlet air to a fuel cell stack so that it can absorb more humidity, according to an embodiment of the present invention.

FIG. 1 is a schematic block diagram of a fuel cell system 10 including a fuel cell stack 12, according to an embodiment of the present invention. A compressor 14 provides a compressed cathode inlet air stream on a cathode input line 16 depending on the load requirement of the fuel cell stack 12. The cathode inlet air from the compressor 14 is sent to a gas/liquid charge air cooler (CAC) 18 that cools the cathode inlet air that has been heated as a result of the compression of the air in the compressor 14. Those skilled in the art will readily recognize various types of suitable charge air coolers that can perform the function described herein. The cooled cathode inlet air from the CAC 18 is then sent to a WVT unit 20 that humidifies the cathode inlet air to a desired humidity level. A cathode exhaust gas on cathode exhaust gas line 22 provides the water and water vapor in the WVT unit 20 to provide the humidification. WVT units that employ suitable membranes for humidifying the cathode inlet air in this manner are well known to those skilled in the art, and various designs are suitable for the purposes described herein. The humidified and temperature reduced cathode inlet air is then sent to the fuel cell stack 12 on the cathode input line. A temperature sensor 26 measures the temperature of the cathode inlet air from the CAC 18 and a relative humidity (RH) sensor 28 measures the relative humidity of the cathode inlet air being applied to the fuel cell stack 12. Alternately, the RH sensor 28 can be replaced with a sensor that measures the high frequency resistance of the stack 12, as is well understood by those skilled in the art.

Fuel cell systems typically include a stack cooling sub-system that drives a cooling fluid through cooling fluid flow channels in the fuel cell stack 12. The stack cooling fluid flows through a coolant loop 32 outside of the stack 12. The cooling fluid is pumped through the coolant loop 32 and the fuel cell stack 12 by a pump 34. The heated cooling fluid from the fuel cell stack 12 is cooled by a radiator 36 before it is returned to the stack 12 to gather waste heat. The radiator 36 would typically be part of a radiator sub-system that included a cooling fan (not shown). A line 38 directs some of the cooling fluid to the CAC 18, as will be discussed in more detail below.

As is well understood in the art, operation of the stack 12 produces significant water that is transferred to the cathode exhaust gas. If the stack 12 is operated below 100% humidity and the relative humidity set-point of the cathode inlet gas is not achieved, the present invention enables an increase of stack relative humidity without increasing the size of the WVT unit 20. This can occur during certain operating conditions of the system 10, such as at high loads.

According to this embodiment of the invention, the system 10 includes a gas/liquid heat exchanger 40 that receives the cooling fluid on the line 38 before it is sent to the CAC 18. The heat exchanger 40 reduces the temperature of the cooling fluid in the line 38 after the heat exchanger 40 so that the CAC 18 reduces the temperature of the cathode inlet air so that it is able to absorb more water vapor in the WVT unit 20. Therefore, even though the relative humidity of the cathode exhaust gas may be reduced, the ability of the cathode inlet air to absorb water is increased, so that the relative humidity requirements of the cathode inlet air can be maintained.

A three-way valve 42 is provided in the line 38 that is controlled to either send the cooling fluid flowing through the line 38 and the heat exchanger 40, as discussed above, or to by-pass the heat exchanger 40 on by-pass line 44 during those times where the relative humidity of the cathode inlet air is at the desired set-point, where the cathode inlet air does not need to be further cooled by the CAC 18. Particularly, if the cathode outlet gas is 100% or above, then the cathode inlet air typically only needs to be cooled to the temperature of the cooling fluid flowing through the stack 12 to meet the relative humidity requirements of the cathode inlet air. Control algorithms can be employed that use the temperature of the cathode inlet air from the CAC 18, as provided by the temperature sensor 26, and the relative humidity of the cathode inlet air, as provided by the relative humidity sensor 28, to control the valve 42.

The heat exchanger 40 can be any heat exchanger suitable for the purposes described herein. In one embodiment, the heat exchanger uses air to provide the cooling through the movement of the vehicle that receives ambient air on line 46. In one specific example, the heat exchanger 40 is the already existing wheel-house heat exchanger, known to those skilled in the art, positioned proximate to the wheels of a vehicle. In that design, the cooling fluid flow for the stack 12 would be re-plumbed in the vehicle so that it traveled through the heat exchanger 40. However, other heat exchangers can be employed in the system 10 consistent with the discussion herein, including those heat exchangers that may include a cooling fan. The amount of heat that is rejected by the heat exchanger 40 depends on the amount of airflow on line 46, i.e., the speed of the vehicle, and the ambient air temperature.

Figure 2:
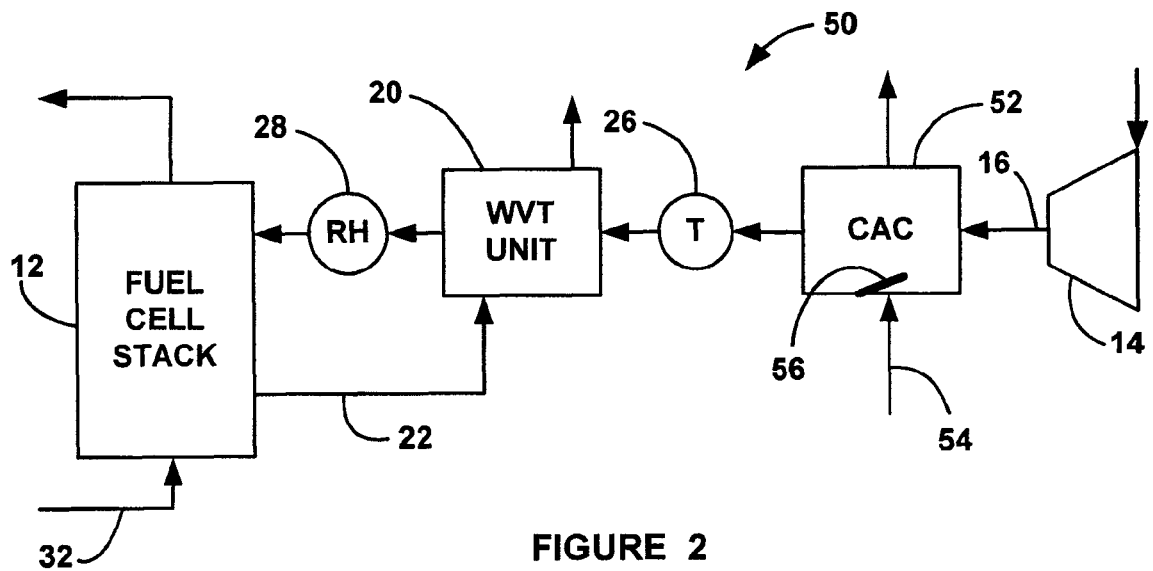
FIG. 2 is a schematic block diagram of a fuel cell system employing a charge air cooler for cooling the cathode inlet air to a fuel cell stack so that it can absorb more humidity, according to another embodiment of the present invention.

In an alternate embodiment, the valve 42 can be one or more valves that selectively allow some of the cooling fluid to by-pass the heat exchanger 40 and some of the cooling fluid to flow through the heat exchanger 40 to provide increased cathode inlet air temperature control. A suitable example for providing this type of design is to use two proportional or digital valves. Alternately, a valve can be provided in the line 38 or a valve can be provided in the by-pass line 44, and the pressure drop of the other line can be adapted to provide the flow distribution through the heat exchanger 40 or around the heat exchanger 40. Also, the heat exchanger 40 can be used to heat the cathode inlet air for reasons that will be discussed below FIG. 2 is a schematic block diagram of a fuel cell system 50, similar to the fuel cell system 10 where like elements are identified by the same reference numeral, according to another embodiment of the present invention. In this embodiment, the cooling fluid that cools the stack 12 is not used to cool the CAC 18, and therefore the valve 42 and the heat exchanger 40 are eliminated. In this embodiment, the charge air cooler is an air/air charge air cooler 52 that receives a cooling airflow on line 54. The CAC 52 includes one or more flaps or dampers 56 that can be selectively opened and closed to allow the cooling air on the line 54 to enter the CAC 52 and reduce the temperature of the cathode inlet air. During those times that the relative humidity of the cathode inlet air drops below the desired RH set-point more air will be forced into the CAC 52 to provide the desired cooling to reduce the temperature of the cathode inlet air and its ability to absorb water vapor, as discussed above. Therefore, the line 54 would be plumbed so that the ambient inlet air to the CAC 52 would increase as the vehicle speed increased. Control algorithms can be employed that use the temperature of the cathode inlet air from the CAC 52, as provided by the temperature sensor 26, and the relative humidity of the cathode inlet air, as provided by the relative humidity sensor 28, to control the dampers 56.

Figure 3:
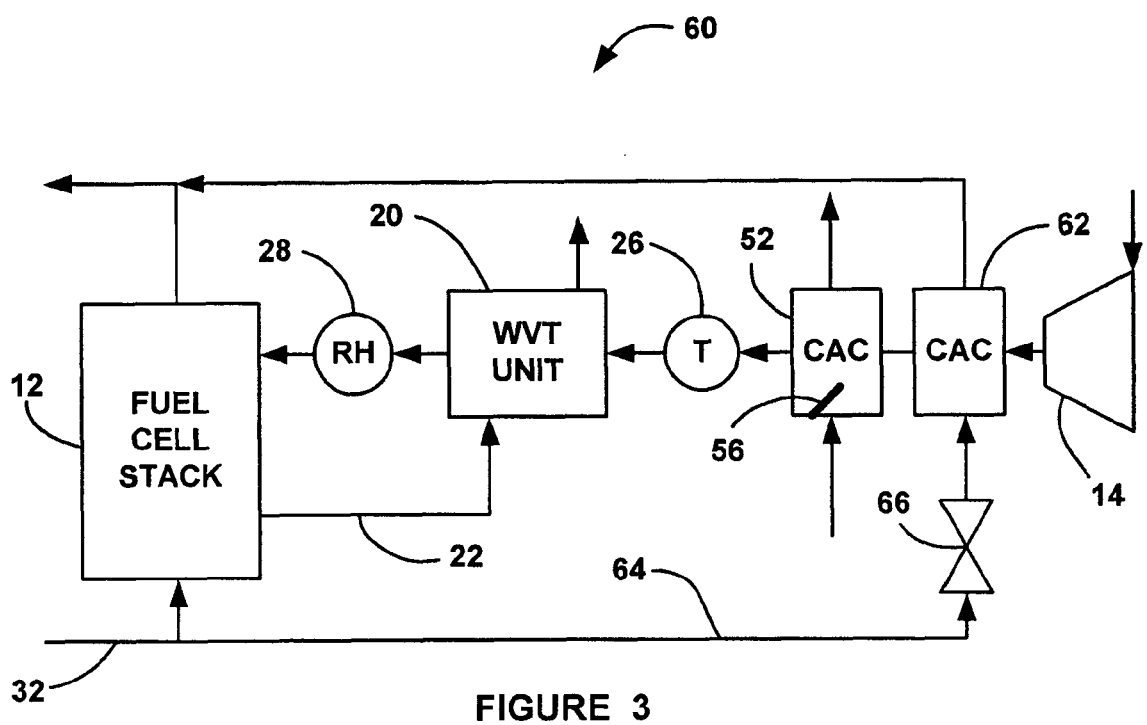
FIG. 3 is a schematic block diagram of a fuel cell system employing two charge air coolers for cooling the cathode inlet air to a fuel cell stack so that it can absorb more humidity, according to another embodiment of the present invention.

There may be certain operating situations where the temperature of the cathode inlet air is too low, such as during start-ups at ambient temperatures below 0° C., where it may absorb too much water vapor and possibly block the cathode flow channels in the fuel cell stack 12. FIG. 3 is a schematic block diagram of a fuel cell system 60 similar to the fuel cell system 50, where like elements are identified by the same reference numeral, according to another embodiment of the present invention. In this design, a second charge air cooler 62 is provided that receives the cathode inlet air from the compressor 14. The CAC 62 is a liquid/air charge air cooler, and receives the stack cooling fluid on line 64. In this embodiment, the CAC 62 operates as a heater in that it uses the heated cooling fluid on the line 64 to increase the temperature of the cathode inlet air from the compressor 14. Once the stack 12 nears its operating temperature, a valve 66 can be closed to prevent the cooling fluid from traveling through the CAC 62. After this time, the temperature of the cathode inlet air is controlled by the CAC 52, as discussed above.

It may be desirable in certain designs to eliminate the valve 66 so that the CAC 62 is continuously maintaining the temperature of the inlet air at the temperature of the cooling fluid, and use the CAC 52 to decrease the temperature from the temperature of the cooling fluid during those times that the relative humidity of the cathode inlet air is below the RH set-point, as discussed above. Further, it may be desirable to make the valve 66 some type of proportional valve that can be selectively controlled to control the amount of the cooling fluid that travels through the CAC 62. Also, the combination of the CAC 62 and the valve 66 can be provided in the system 10 for the same purposes described herein.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack including a cathode inlet line and a cathode outlet line;
   a compressor for providing cathode inlet air to the cathode inlet line;
   a first charge air cooler for reducing a temperature of the cathode inlet air from the compressor;
   a water vapor transfer unit for humidifying the cathode inlet air traveling through the cathode input line, said water vapor transfer unit receiving a cathode exhaust gas from the cathode exhaust gas line for providing humidity for the cathode inlet air;
   a heat exchanger for reducing a temperature of a stack cooling fluid flow sent to the first charge air cooler to cool the cathode inlet air, said heat exchanger receiving ambient air for cooling the cooling fluid; and
   a valve assembly for by-passing the cooling fluid on a by-pass line around the heat exchanger, said valve assembly being controlled so that the heat exchanger is by-passed if a relative humidity of the cathode inlet air is at or above a predetermined RH set-point and sending the cooling fluid to the heat exchanger if the relative humidity of the cathode inlet air is below the RH set-point.

2. The system according to claim 1 further comprising a temperature sensor for measuring the temperature of the cathode inlet air and a device for measuring the relative humidity of the cathode inlet air, wherein the valve assembly is controlled using the temperature and relative humidity measurements to maintain the relative humidity of the cathode inlet air at or above the predetermined RH set-point.

3. The system according to claim 1 wherein the valve assembly is selectively controlled so that a portion of the cooling fluid by-passes the heat exchanger and a portion of the cooling fluid flows through the heat exchanger so as to selectively control the temperature of the cooling fluid provided to the first charge air cooler.

4. The system according to claim 1 wherein the valve assembly is a single valve positioned in the by-pass line or in a cooling fluid line coupled to the heat exchanger where the valve controls the amount of cooling fluid by-passing or traveling through the heat exchanger.

5. The system according to claim 1 wherein the heat exchanger is a wheel house heat exchanger.

6. The system according to claim 1 wherein the cooling fluid is a cooling fluid that is used to cool the fuel cell stack.

7. The system according to claim 1 wherein the fuel cell system is on a vehicle.

8. A fuel cell system comprising:
   a fuel cell stack including a cathode inlet line and a cathode outlet line;
   a compressor for providing cathode inlet air to the cathode inlet line;
   a first charge air cooler for reducing a temperature of the cathode inlet air from the compressor, said first charged air cooler being a gas/gas charge air cooler that uses an inlet air flow to cool the cathode inlet air, said first charge air cooler including at least one damper that is selectively opened and closed to increase or decrease an amount of air cooling provided by the first charge air cooler; and
   a water vapor transfer unit for humidifying the cathode inlet air traveling through the cathode input line, said water vapor transfer unit receiving a cathode exhaust gas from the cathode exhaust gas line for providing humidity for the cathode inlet air.

9. The system according to claim 8 further comprising a temperature sensor for measuring the temperature of the cathode inlet air and a device for measuring a relative humidity of the cathode inlet air, wherein the damper is controlled using the temperature and relative humidity measurements to maintain the relative humidity of the cathode inlet air at or above a predetermined relative humidity.

10. The system according to claim 8 further comprising a second charge air cooler for increasing the temperature of the cathode inlet air from the compressor, said second charge air cooler being used to heat the cathode inlet air from the compressor during cold start-up of the system.

11. The system according to claim 10 wherein the second charge air cooler is a gas/liquid charge air cooler where the liquid used to increase the temperature of the cathode inlet air is a cooling fluid that is used to cool the fuel cell stack.

12. The system according to claim 11 further comprising a valve that is selectively opened and closed to provide the cooling fluid to the second charge air cooler, prevent a portion of the cooling fluid to flow to the second charge air cooler or prevent the cooling fluid from flowing to the second charge air cooler.

13. The system according to claim 8 wherein the fuel cell system is on a vehicle.

14. A fuel cell system comprising:
   a fuel cell stack including a cathode inlet line and a cathode outlet line;
   a compressor for providing the a cathode inlet air to the cathode inlet line;
   a first charge air cooler receiving the cathode inlet air from the compressor, said first charge air cooler being a gas/liquid charge air cooler where the liquid used to increase a temperature of the cathode inlet air is a cooling fluid that is used to cool the fuel cell stack, said first charge air cooler increasing the temperature of the cathode inlet air from the compressor when the fuel cell stack is below a predetermined temperature during cold system start-ups;
   a second charge air cooler receiving the cathode inlet air from the first charge air cooler, said second charge air cooler being a gas/gas charge air cooler that uses an inlet air flow to cool the cathode inlet air, wherein the second charge air cooler includes at least one damper that is selectively opened and closed to increase or decrease an amount of air cooling provided by the second charge air cooler; and
   a temperature sensor, said temperature sensor located in the cathode input line between the fuel cell stack and the second charge air cooler, said temperature sensor measuring the temperature of the cathode inlet air from the charge air cooler.

15. The system according to claim 14 further comprising a valve that is selectively opened and closed to provide the cooling fluid to the first charge air cooler, prevent a portion of the cooling fluid to flow to the first charge air cooler or prevent the cooling fluid from flowing to the charge air cooler.

16. The system according to claim 14 wherein the fuel cell system is on a vehicle.

17. The system according to claim 2 wherein the temperature sensor is located in the cathode input line between the fuel cell stack and the first charge air cooler, said temperature sensor measuring the temperature of the cathode inlet air from the first charge air cooler.

18. The system according to claim 9 wherein the temperature sensor is located in the cathode input line between the fuel cell stack and the first charge air cooler, said temperature sensor measuring the temperature of the cathode inlet air from the first charge air cooler.

* * * * *